United States Patent
Griffin et al.

(10) Patent No.: US 12,556,757 B2
(45) Date of Patent: Feb. 17, 2026

(54) REACTION AGGREGATION SYSTEM AND METHOD

(71) Applicant: Eve, Esther, Mary and Martha LLC, Midland, TX (US)

(72) Inventors: Stephanie Griffin Griffin, Midland, TX (US); Andrea Yvette Carter, Dallas, TX (US)

(73) Assignee: EVE, ESTHER, MARY AND MARTHA LLC, Midland, TX (US)

( * ) Notice: Subject to any disclaimer, the term of this patent is extended or adjusted under 35 U.S.C. 154(b) by 0 days.

(21) Appl. No.: 18/649,498

(22) Filed: Apr. 29, 2024

(65) Prior Publication Data

US 2024/0364955 A1  Oct. 31, 2024

Related U.S. Application Data (60) Provisional application No. 63/499,228, filed on Apr. 29, 2023.

(51) Int. Cl.
*H04N 21/442* (2011.01)
*H04N 21/43* (2011.01)

(52) U.S. Cl.
CPC ........... *H04N 21/43072* (2020.08); *H04N 21/44218* (2013.01)

(58) Field of Classification Search
CPC ............................................. H04N 21/44218
See application file for complete search history.

(56) References Cited

U.S. PATENT DOCUMENTS 11,451,885 B1 * 9/2022 Chandrashekar ..... G06F 40/166

* cited by examiner

*Primary Examiner* — Michael H Hong
(74) *Attorney, Agent, or Firm* — Brian J. Colandreo; Heath M. Sargeant; Holland & Knight LLP (57) ABSTRACT

A method, computer program product, and computing system for: providing streaming media to a first viewer; receiving one or more temporal first viewer reactions while the first viewer is consuming the streaming media; providing the streaming media to additional viewers; receiving one or more temporal additional viewer reactions while the additional viewers are consuming the streaming media; temporally aligning the one or more temporal first viewer reactions with the one or more temporal additional viewer reactions to form multi-viewer temporal commentary for the streaming media; and temporally providing the multi-viewer temporal commentary for the streaming media to future viewers of the streaming media while the future viewers are consuming the streaming media.

15 Claims, 4 Drawing Sheets

REACTION AGGREGATION SYSTEM AND METHOD

RELATED APPLICATION(S)

This application claims the benefit of U.S. Provisional Application No. 63/499,228, filed on 29 Apr. 2023, the entire contents of which are incorporated herein by reference.

TECHNICAL FIELD

This disclosure relates to aggregation systems and methods and, more particularly, to systems and methods that aggregate viewer reactions to streaming media.

BACKGROUND

Social media platforms have undergone significant evolution since their inception, tracing back to the early days of internet forums and bulletin boards in the 1970s and 1980s. These early platforms laid the groundwork for the interconnected online communities we see today. The launch of SixDegrees in 1997 marked the beginning of what we now recognize as social media, offering users the ability to create profiles and list friends. This was further developed by platforms like Friendster in 2002, which introduced social networking features such as connecting with friends and sharing content.

By 2003, Myspace had become a dominant force in the social media landscape, allowing users to customize their profiles and connect in more personal ways. However, it was soon overtaken by Facebook in 2004, which revolutionized the way people interact online with its cleaner interface, privacy controls, and innovative features like news feeds and groups. Twitter, launched in 2006, introduced the concept of microblogging, enabling users to share updates and information in real-time, becoming a vital tool for news dissemination and public discourse.

The social media ecosystem continued to expand with the introduction of platforms focusing on specific types of content, such as YouTube for video sharing in 2005, Instagram for photos in 2010, Snapchat for ephemeral messages in 2011, Pinterest for visual bookmarking also in 2010, and TikTok for short-form videos in 2016. Each platform offered unique ways for users to share content, connect, and express themselves, catering to diverse interests and needs.

The benefits of social media are numerous. These platforms enable connectivity, allowing people to maintain relationships across distances and meet new people. They are powerful tools for information sharing, offering access to news, educational content, and a platform for voicing opinions. Social media also facilitates networking for professionals, provides businesses with marketing and promotional tools, and serves as a hub for community building among individuals with shared interests. Additionally, social media platforms offer entertainment, educational resources, and avenues for personal expression. They have played significant roles in raising awareness for social issues, organizing activism, and mobilizing community support.

However, the impact of social media is not solely positive. Issues such as privacy concerns, the spread of misinformation, and potential addiction highlight the importance of using these platforms responsibly and critically engaging with the content shared. Despite these challenges, the continued evolution and adaptation of social media platforms suggest they will remain integral to our digital lives, shaping how we communicate, learn, and connect with the world around us.

SUMMARY OF DISCLOSURE

In one implementation, a computer-implemented method is executed on a computing device and includes: providing streaming media to a first viewer; receiving one or more temporal first viewer reactions while the first viewer is consuming the streaming media; providing the streaming media to additional viewers; receiving one or more temporal additional viewer reactions while the additional viewers are consuming the streaming media; temporally aligning the one or more temporal first viewer reactions with the one or more temporal additional viewer reactions to form multi-viewer temporal commentary for the streaming media; and temporally providing the multi-viewer temporal commentary for the streaming media to future viewers of the streaming media while the future viewers are consuming the streaming media.

One or more of the following features may be included. The streaming media may include one or more of: a podcast; a streaming media file; a political advertisement; a movie screening; a business presentation; an informational presentation; a communal/regional presentation; and an educational presentation. The reactions may include one or more of: an emoji; a text-based comment; an image-based comment; a video-based comment; an audio-based comment; and a link-based external information source. The viewer reactions may be time stamped to associate viewer reactions with specific portions of the streaming media. Temporally aligning the one or more temporal first viewer reactions with the one or more temporal additional viewer reactions to form multi-viewer temporal commentary for the streaming media may include: sequencing the combination of the one or more temporal first viewer reactions and the one or more temporal additional viewer reactions based, at least in part, upon the time stamp of the viewer reactions. Temporally providing the multi-viewer temporal commentary for the streaming media to future viewers of the streaming media while the future viewers are consuming the streaming media may include: identifying a portion of the streaming media currently being consumed by the future viewers, thus defining a currently-consumed portion. Temporally providing the multi-viewer temporal commentary for the streaming media to future viewers of the streaming media while the future viewers are consuming the streaming media may further include: associating a portion of the multi-viewer temporal commentary with the currently-consumed portion of the streaming media, thus defining an associated portion. Temporally providing the multi-viewer temporal commentary for the streaming media to future viewers of the streaming media while the future viewers are consuming the streaming media may further include: rendering the associated portion of the multi-viewer temporal commentary while the future viewers of the streaming media are consuming the currently-consumed portion of the streaming media.

In another implementation, a computer program product resides on a computer readable medium and has a plurality of instructions stored on it. When executed by a processor, the instructions cause the processor to perform operations including: providing streaming media to a first viewer; receiving one or more temporal first viewer reactions while the first viewer is consuming the streaming media; providing the streaming media to additional viewers; receiving one or more temporal additional viewer reactions while the additional viewers are consuming the streaming media; temporally aligning the one or more temporal first viewer reactions with the one or more temporal additional viewer reactions to form multi-viewer temporal commentary for the streaming media; and temporally providing the multi-viewer temporal commentary for the streaming media to future viewers of the streaming media while the future viewers are consuming the streaming media.

One or more of the following features may be included. The streaming media may include one or more of: a podcast; a streaming media file; a political advertisement; a movie screening; a business presentation; an informational presentation; a communal/regional presentation; and an educational presentation. The reactions may include one or more of: an emoji; a text-based comment; an image-based comment; a video-based comment; an audio-based comment; and a link-based external information source. The viewer reactions may be time stamped to associate viewer reactions with specific portions of the streaming media. Temporally aligning the one or more temporal first viewer reactions with the one or more temporal additional viewer reactions to form multi-viewer temporal commentary for the streaming media may include: sequencing the combination of the one or more temporal first viewer reactions and the one or more temporal additional viewer reactions based, at least in part, upon the time stamp of the viewer reactions. Temporally providing the multi-viewer temporal commentary for the streaming media to future viewers of the streaming media while the future viewers are consuming the streaming media may include: identifying a portion of the streaming media currently being consumed by the future viewers, thus defining a currently-consumed portion. Temporally providing the multi-viewer temporal commentary for the streaming media to future viewers of the streaming media while the future viewers are consuming the streaming media may further include: associating a portion of the multi-viewer temporal commentary with the currently-consumed portion of the streaming media, thus defining an associated portion. Temporally providing the multi-viewer temporal commentary for the streaming media to future viewers of the streaming media while the future viewers are consuming the streaming media may further include: rendering the associated portion of the multi-viewer temporal commentary while the future viewers of the streaming media are consuming the currently-consumed portion of the streaming media.

In another implementation, a computing system includes a processor and memory is configured to perform operations including: providing streaming media to a first viewer; receiving one or more temporal first viewer reactions while the first viewer is consuming the streaming media; providing the streaming media to additional viewers; receiving one or more temporal additional viewer reactions while the additional viewers are consuming the streaming media; temporally aligning the one or more temporal first viewer reactions with the one or more temporal additional viewer reactions to form multi-viewer temporal commentary for the streaming media; and temporally providing the multi-viewer temporal commentary for the streaming media to future viewers of the streaming media while the future viewers are consuming the streaming media.

One or more of the following features may be included. The streaming media may include one or more of: a podcast; a streaming media file; a political advertisement; a movie screening; a business presentation; an informational presentation; a communal/regional presentation; and an educational presentation. The reactions may include one or more of: an emoji; a text-based comment; an image-based comment; a video-based comment; an audio-based comment; and a link-based external information source. The viewer reactions may be time stamped to associate viewer reactions with specific portions of the streaming media. Temporally aligning the one or more temporal first viewer reactions with the one or more temporal additional viewer reactions to form multi-viewer temporal commentary for the streaming media may include: sequencing the combination of the one or more temporal first viewer reactions and the one or more temporal additional viewer reactions based, at least in part, upon the time stamp of the viewer reactions. Temporally providing the multi-viewer temporal commentary for the streaming media to future viewers of the streaming media while the future viewers are consuming the streaming media may include: identifying a portion of the streaming media currently being consumed by the future viewers, thus defining a currently-consumed portion. Temporally providing the multi-viewer temporal commentary for the streaming media to future viewers of the streaming media while the future viewers are consuming the streaming media may further include: associating a portion of the multi-viewer temporal commentary with the currently-consumed portion of the streaming media, thus defining an associated portion. Temporally providing the multi-viewer temporal commentary for the streaming media to future viewers of the streaming media while the future viewers are consuming the streaming media may further include: rendering the associated portion of the multi-viewer temporal commentary while the future viewers of the streaming media are consuming the currently-consumed portion of the streaming media.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
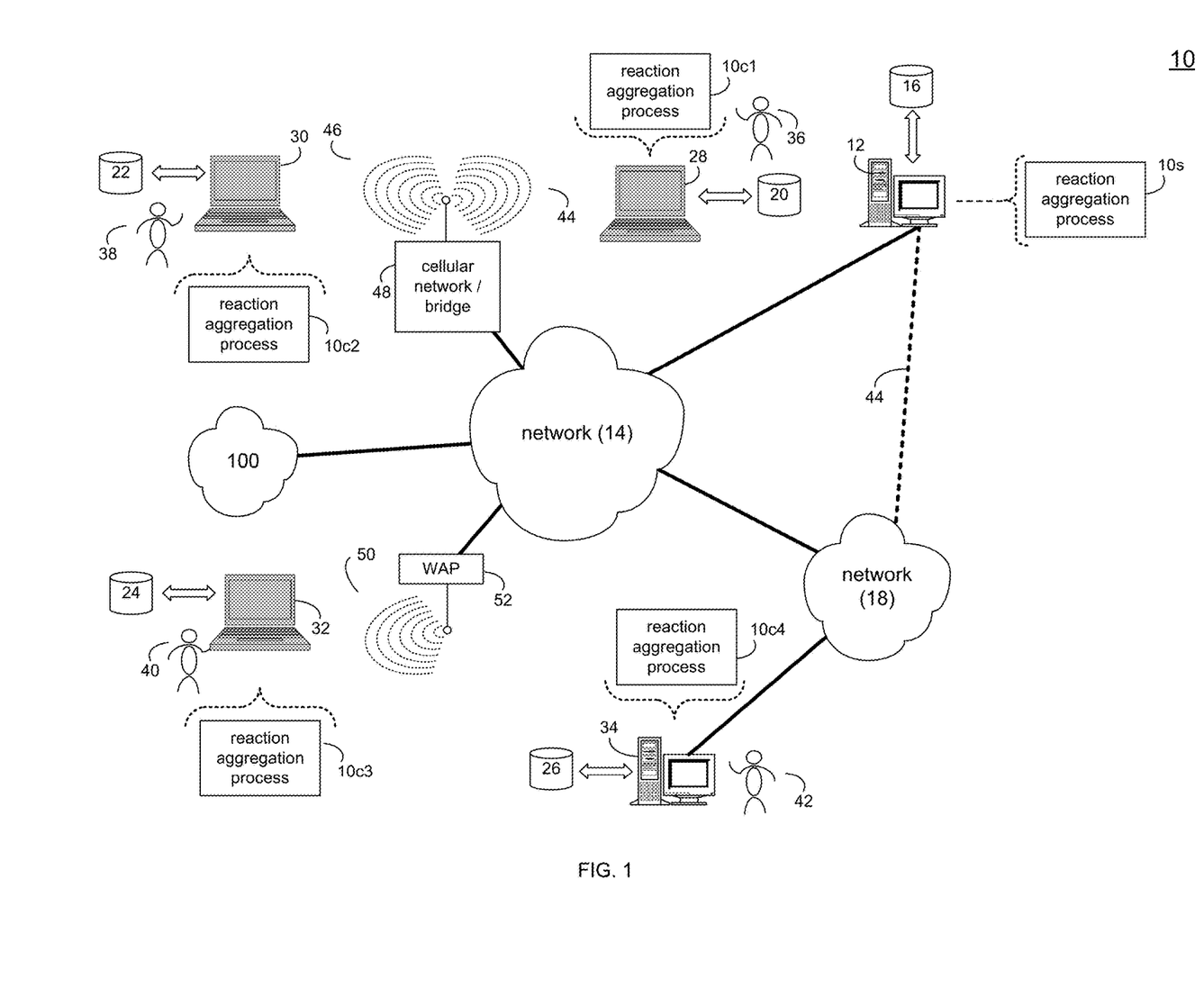
FIG. 1 is a diagrammatic view of a distributed computing network including a computing device that executes a reaction aggregation process according to an embodiment of the present disclosure.

Referring to FIG. 1, there is shown reaction aggregation process 10. Reaction aggregation process 10 may be implemented as a server-side process, a client-side process, or a hybrid server-side/client-side process. For example, reaction aggregation process 10 may be implemented as a purely server-side process via reaction aggregation process 10s. Alternatively, reaction aggregation process 10 may be implemented as a purely client-side process via one or more of reaction aggregation process 10c1, reaction aggregation process 10c2, reaction aggregation process 10c3, and reaction aggregation process 10c4. Alternatively still, reaction aggregation process 10 may be implemented as a hybrid server-side/client-side process via reaction aggregation process 10s in combination with one or more of reaction aggregation process 10c1, reaction aggregation process 10c2, reaction aggregation process 10c3, and reaction aggregation process 10c4. Accordingly, reaction aggregation process 10 as used in this disclosure may include any combination of reaction aggregation process 10s, reaction aggregation process 10c1, reaction aggregation process 10c2, reaction aggregation process 10c3, and reaction aggregation process 10c4.

Reaction aggregation process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a cloud-based computing platform.

The instruction sets and subroutines of reaction aggregation process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a RAID device; a random-access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of reaction aggregation processes 10c1, 10c2, 10c3, 10c4 may include but are not limited to a web browser, a game console user interface, a mobile device user interface, or a specialized application (e.g., an application running on e.g., the Android™ platform, the iOS™ platform, the Windows™ platform, the Linux™ platform or the UNIX™ platform). The instruction sets and subroutines of reaction aggregation processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; RAID devices; random access memories (RAM); read-only memories (ROM), and all forms of flash memory storage devices.

Examples of client electronic devices 28, 30, 32, 34 may include, but are not limited to, a smartphone (not shown), a personal digital assistant (not shown), a tablet computer (not shown), laptop computers 28, 30, 32, personal computer 34, a notebook computer (not shown), a server computer (not shown), a gaming console (not shown), and a dedicated network device (not shown). Client electronic devices 28, 30, 32, 34 may each execute an operating system, examples of which may include but are not limited to Microsoft Windows™, Android™, iOS™, Linux™, or a custom operating system.

Users 36, 38, 40, 42 may access reaction aggregation process 10 directly through network 14 or through secondary network 18. Further, reaction aggregation process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, laptop computer 28 and laptop computer 30 are shown wirelessly coupled to network 14 via wireless communication channels 44, 46 (respectively) established between laptop computers 28, 30 (respectively) and cellular network/bridge 48, which is shown directly coupled to network 14. Further, laptop computer 32 is shown wirelessly coupled to network 14 via wireless communication channel 50 established between laptop computer 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between laptop computer 32 and WAP 52. As is known in the art, IEEE 802.11x specifications may use Ethernet protocol and carrier sense multiple access with collision avoidance (i.e., CSMA/CA) for path sharing. As is known in the art, Bluetooth is a telecommunications industry specification that allows e.g., mobile phones, computers, and personal digital assistants to be interconnected using a short-range wireless connection.

Reaction Aggregation Process Overview

Figure 2:
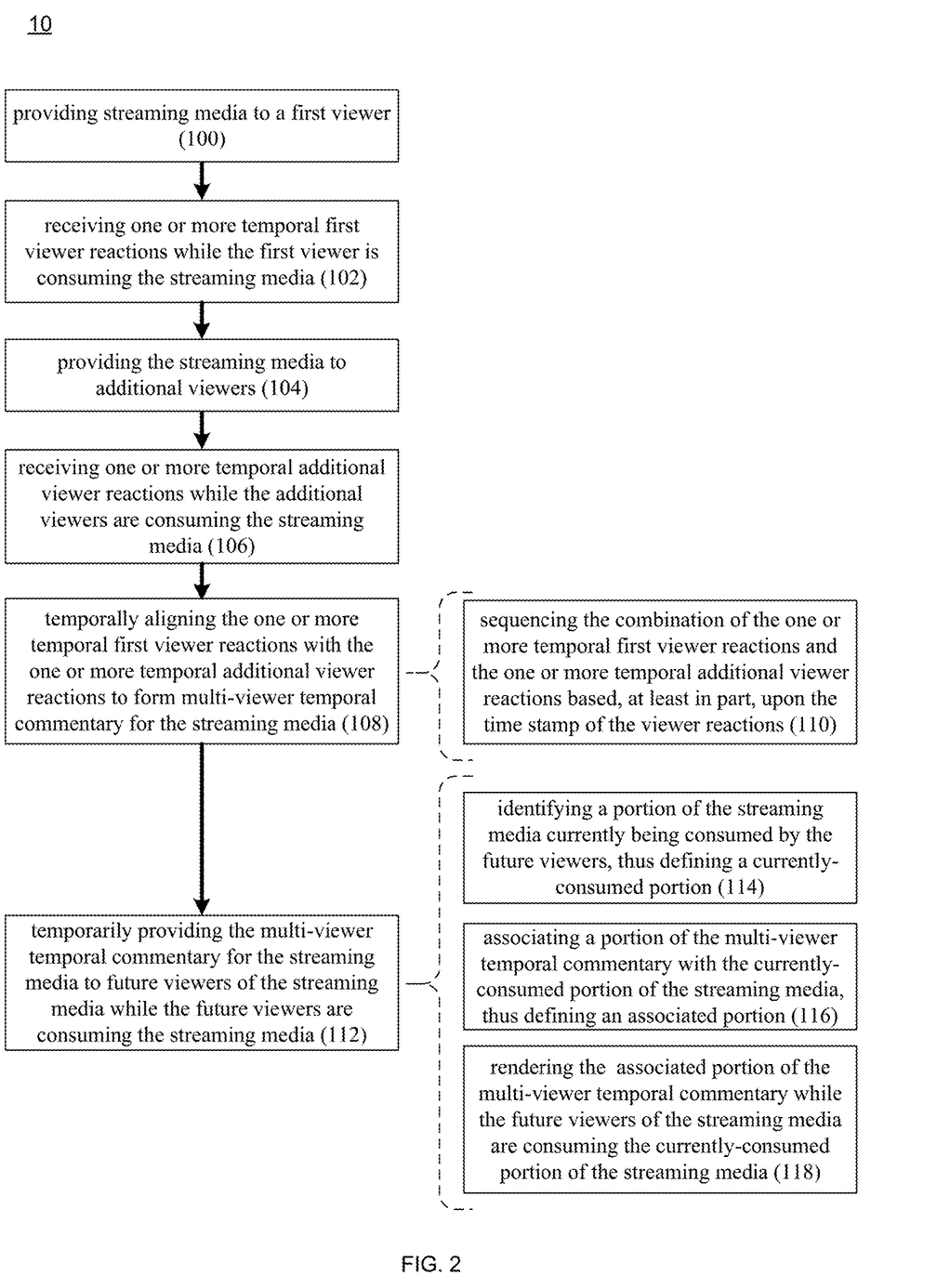
FIG. 2 is a flowchart of the reaction aggregation process of FIG. 1 according to an embodiment of the present disclosure.
Figure 3:
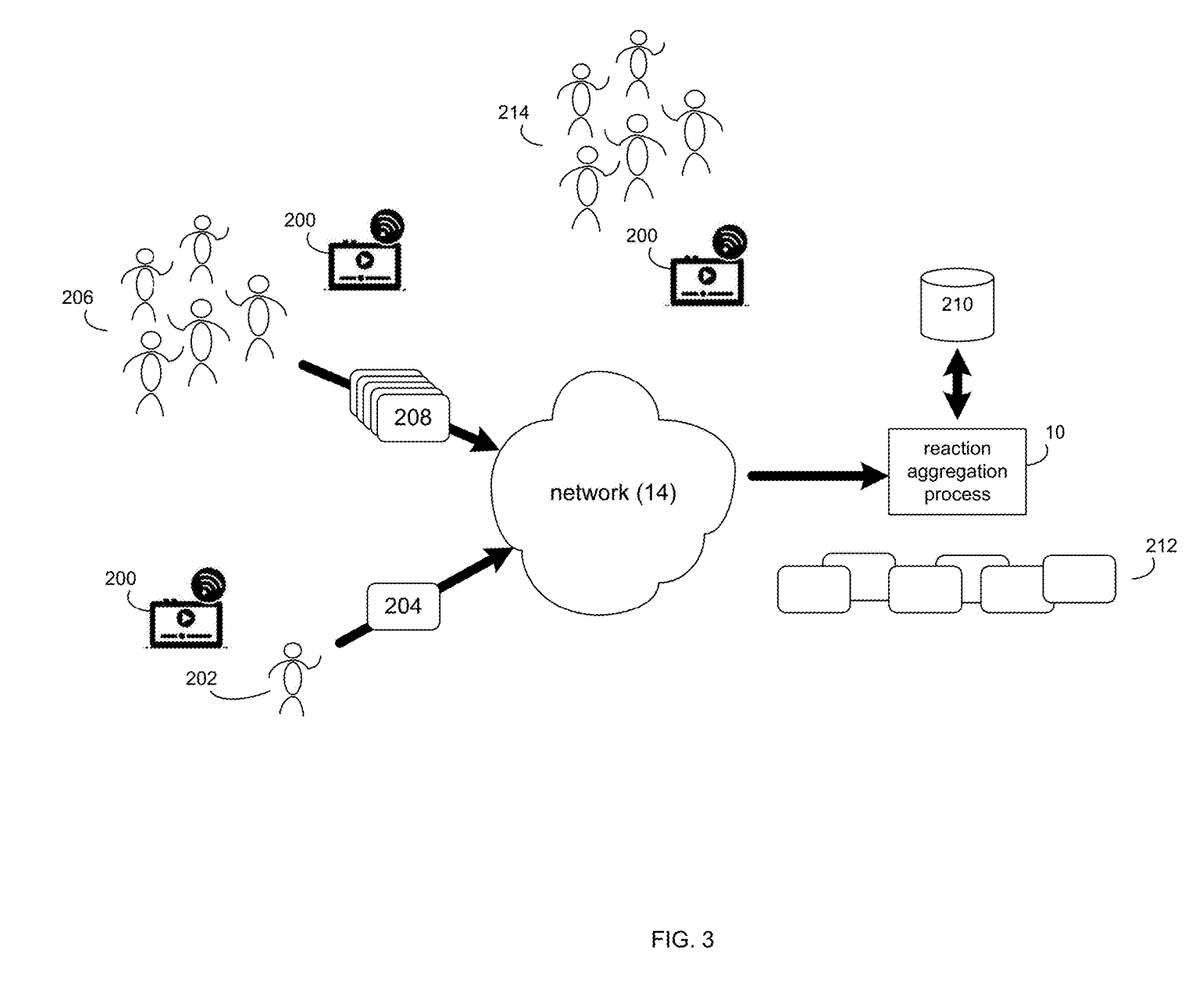
FIG. 3 is a diagrammatic view of the manner in which streaming media is consumed and reactions are received by the reaction aggregation process of FIG. 1 according to an embodiment of the present disclosure.

Referring also to FIGS. 2-3, reaction aggregation process 10 may provide 100 streaming media (e.g., streaming media 200) to a first viewer (e.g., first viewer 202). Streaming media 200 may be provided 100 to first viewer 202 via e.g., network 14 (e.g., the Internet or a local area network).

The streaming media (e.g., streaming media 200) may include one or more of: a podcast; a streaming media file; a political advertisement; a movie screening; a business presentation; an informational presentation; a communal/regional presentation; and an educational presentation.

Podcast: A podcast may be a digital media series, primarily audio, designed for download or streaming over the Internet. Podcasts may be episodic, with new episodes released on a regular schedule. They may cover an array of subjects such as news, education, stories, interviews, and more, catering to niche interests or broad audiences alike.

Streaming Media File: A streaming media file may refer to video or audio content that is played over the internet in real-time without being fully downloaded to a device. Streaming technology may allow users to start watching or listening to content immediately as data is transmitted in a continuous stream. This format is widely used for watching movies, TV shows, live events, and listening to music on various devices.

Political Advertisement: A political advertisement may be a type of advertisement specifically aimed at influencing the decision-making process within a political system. This may include ads supporting or opposing a candidate for public office, a political party, or a specific ballot initiative. Political ads may be designed to sway public opinion, increase voter turnout, or solicit donations.

Movie Screening: A movie screening may refer to the advanced showing of a film, often before it is widely released to the general public. Screenings may be exclusive events, such as premieres for cast, crew, and celebrities, or test screenings aimed at gauging audience reactions. There may also be public screenings, which can be either commercial showings to the general audience or special presentations.

Business Presentation: A business presentation may be a demonstration presented in a business context to convey information, pitch ideas, or report progress to an audience. This may involve presenting financial results to stakeholders, pitching a new product to investors, or sharing strategic plans with a team. Business presentations may use supportive visuals like slides to help articulate the message clearly and persuasively.

Informational Presentation: An informational presentation may be any presentation designed primarily to inform its audience about a specific topic, data set, or research finding. Unlike business presentations, which are often geared toward decision-making or persuasion, informational presentations aim to educate or update the audience on particular facts, insights, or developments. These can occur in various contexts, from academic conferences to public seminars.

Communal/Regional Presentation: A communal/regional presentation focuses on topics of interest or concern to a specific community or geographic area. These presentations might cover local government initiatives, community projects, regional histories, or local environmental issues. The primary aim may be to inform, engage, or mobilize local populations around shared interests or concerns.

Educational Presentation: An educational presentation may be specifically designed with the goal of teaching or educating an audience on a particular subject, topic, or skill. This type of presentation may be common in academic settings but is also used in professional development workshops and other educational contexts. Educational presentations may be structured to facilitate learning, often incorporating interactive elements, discussion, and multimedia aids to enhance engagement and comprehension.

Examples of the first viewer (e.g., first viewer 202) may include any consumer of the streaming media (e.g., streaming media 200), examples of which may include but are not limited to:

A viewer/listener of a podcast.
A viewer/listener of a streaming media file.
A viewer/listener of a political advertisement, such as a potential voter, a campaign supporter, a political reporter, etc.
A watcher of a movie screening, such as a movie critic, a movie/entertainment reporter, etc.
A consumer of a business presentation, such as an employee, a new hire, a manager, etc.
A consumer of an informational presentation, such as a potential buyer of a product, a potential consumer of a service, etc.
A consumer of a communal/regional presentation, such as a resident of a community, a member of a special interest group, etc.
A consumer of an educational presentation, such as a student, a teacher, etc.

Reaction aggregation process 10 may receive 102 one or more temporal first viewer reactions (e.g., temporal first viewer reactions 204) while the first viewer (e.g., first viewer 202) is consuming the streaming media (e.g., streaming media 200).

A temporal first viewer reaction (e.g., temporal first viewer reactions 204) in the context of streaming media (e.g., streaming media 200) may refer to the response or feedback provided by a viewer (e.g., first viewer 202) at a specific moment within the timeline of the streamed content (e.g., streaming media 200). Essentially, it's the reaction expressed by a viewer while watching a live stream, recorded video, or any other form of streaming media (e.g., streaming media 200). This reaction could manifest in various ways, such as a text comment, an emoji, an audio response, or any other form of interaction available on the streaming platform.

The term "temporal" in this context simply denotes the time-related aspect of the viewer's reaction, indicating that it is linked to a particular moment or scene within the streaming media (e.g., streaming media 200). Temporal first viewer reactions (e.g., temporal first viewer reactions 204) are significant because they provide immediate feedback on how viewers are engaging with the content in real-time. These reactions (e.g., temporal first viewer reactions 204) can offer valuable insight into which moments are resonating with the audience, what aspects of the content are eliciting strong emotions or responses, and how the overall viewing experience is being perceived by viewers.

The reactions (e.g., temporal first viewer reactions 204) may include one or more of: an emoji; a text-based comment; an image-based comment; a video-based comment; an audio-based comment; and a link-based external information source.

Emoji: An emoji may be a small digital image or icon used to express an idea, emotion, or feeling in electronic communications. Originally derived from Japanese mobile phones in the 1990s, emojis have become a ubiquitous part of online messaging and social media, offering a way to convey non-verbal cues and add emotional nuance to text.

Text-Based Comment: A text-based comment may be a written response or remark made on digital platforms, such as social media posts, articles, or videos. This type of comment uses plain text to express opinions, ask questions, or provide feedback. Text-based comments are the most traditional form of online interaction, allowing for detailed and specific communication.

Image-Based Comment: An image-based comment may involve using an image to respond or contribute to a discussion in digital spaces. Rather than relying on written text, users post pictures, memes, or GIFs to convey their reactions, thoughts, or emotions. This form of comment can add a visual and often more expressive layer to online conversations.

Video-Based Comment: A video-based comment may be a response or remark made using video content. Instead of typing out their thoughts, users record and post short videos to express themselves. This can be particularly engaging, as it allows commenters to use facial expressions, tone of voice, and visual context to communicate their messages more dynamically.

Audio-Based Comment: An audio-based comment may be a response or input provided in audio format. Users record their voice or other sounds to react or add to a discussion, offering a personal touch and conveying nuances that text alone might miss. Audio comments can make digital interactions feel more direct and personal, bridging the gap between written communication and face-to-face conversation.

Link-Based External Information Source: A link-based external information source may refer to sharing a URL or hyperlink in a comment or post that directs readers to another webpage or digital resource. This method is used to provide additional information, reference sources, or direct others to related content. Link-based sharing can enrich conversations by offering direct access to external articles, studies, videos, or other relevant online materials.

Each of these communication methods may have its advantages, allowing users to express themselves and share information in ways that best suit their message and the context of the conversation.

The viewer reactions (e.g., temporal first viewer reactions 204) may be time stamped to associate viewer reactions (e.g., temporal first viewer reactions 204) with specific portions of the streaming media (e.g., streaming media 200).

Time-stamping viewer reactions in the context of streaming media may involve marking the specific moments within the media's timeline when viewers express reactions, comments, or interactions. This practice effectively associates viewer responses with particular scenes, segments, or elements of the streamed media (e.g., streaming media 200), allowing for a rich, interactive viewing experience. The implications of this approach are multifaceted, offering enhanced engagement, contextual relevance, and valuable insights for content creators and viewers alike.

Firstly, time-stamped reactions facilitate a dynamic form of viewer interaction that remains visible in real-time or as part of the content's permanent record, thereby enabling content creators to directly observe how their audience responds to different parts of the media. This immediate feedback serves as a powerful tool for creators, offering them a clear understanding of which moments truly resonate with their audience, be it through humor, surprise, or emotional impact. Moreover, these reactions provide precise, contextual feedback, making it easier for both creators and viewers to engage in detailed discussions about specific aspects of the content.

From a content analysis perspective, time-stamped reactions are invaluable. They allow creators and analysts to pinpoint exactly what aspects of their content are most engaging or need improvement, informing future content creation and refinement strategies. Additionally, these reactions can be used to create highlights or compilation videos that showcase the most impactful moments of the content, further enhancing promotional efforts and community engagement.

For viewers, time-stamped reactions not only enrich the viewing experience by highlighting communal reactions and facilitating engagement with the content and other viewers but also serve as a navigational aid. Especially in longer streams or videos, these markers help viewers locate and jump to significant or popular segments, improving accessibility and viewer satisfaction.

In summary, time-stamping viewer reactions to streaming media (e.g., streaming media 200) may enrich the content creation and consumption process, enabling a level of interaction and feedback that was previously unattainable. This technology may foster a more engaged, informed, and connected viewing community, marking a significant advancement in how digital content is experienced and analyzed.

Additionally, reaction aggregation process 10 may provide 104 the streaming media (e.g., streaming media 200) to additional viewers (e.g., additional viewers 206). For example, the streaming media (e.g., streaming media 200) may be consumed by hundreds . . . thousands . . . or hundreds of thousands of additional viewers (e.g., additional viewers 206). Streaming media 200 may be provided 104 to additional viewers 206 via e.g., network 14 (e.g., the Internet or a local area network).

As discussed above, the streaming media (e.g., streaming media 200) may include one or more of: a podcast; a streaming media file; a political advertisement; a movie screening; a business presentation; an informational presentation; a communal/regional presentation; and an educational presentation.

Also and as discussed above, examples of the additional viewers (e.g., additional viewers 206) may include any consumer of the streaming media (e.g., streaming media 200), examples of which may include but are not limited to:

A viewer/listener of a podcast.

A viewer/listener of a streaming media file.

A viewer/listener of a political advertisement, such as a potential voter, a campaign supporter, a political reporter, etc.

A watcher of a movie screening, such as a movie critic, a movie/entertainment reporter, etc.

A consumer of a business presentation, such as an employee, a new hire, a manager, etc.

A consumer of an informational presentation, such as a potential buyer of a product, a potential consumer of a service, etc.

A consumer of a communal/regional presentation, such as a resident of a community, a member of a special interest group, etc.

A consumer of an educational presentation, such as a student, a teacher, etc.

Reaction aggregation process 10 may receive 106 one or more temporal additional viewer reactions (e.g., temporal additional viewer reactions 208) while the additional viewers (e.g., additional viewers 206) are consuming the streaming media (e.g., streaming media 200).

As discussed above, the reactions (e.g., temporal additional viewer reactions 208) may include one or more of: an emoji; a text-based comment; an image-based comment; a video-based comment; an audio-based comment; and a link-based external information source.

Reaction aggregation process 10 may temporally align 108 the one or more temporal first viewer reactions (e.g., temporal first viewer reactions 204) with the one or more temporal additional viewer reactions (e.g., temporal additional viewer reactions 208) to form multi-viewer temporal commentary (e.g., multi-viewer temporal commentary 210) for the streaming media (e.g., streaming media 200).

For example and when temporally aligning 108 the one or more temporal first viewer reactions (e.g., temporal first viewer reactions 204) with the one or more temporal additional viewer reactions (e.g., temporal additional viewer reactions 208) to form multi-viewer temporal commentary (e.g., multi-viewer temporal commentary 210) for the streaming media (e.g., streaming media 200), reaction aggregation process 10 may sequence 110 the combination (e.g., combination 212) of the one or more temporal first viewer reactions (e.g., temporal first viewer reactions 204) and the one or more temporal additional viewer reactions (e.g., temporal additional viewer reactions 208) based, at least in part, upon the time stamp of the viewer reactions (e.g., temporal first viewer reactions 204 and/or temporal additional viewer reactions 208).

Generally speaking, the concept of temporally aligning first viewer reactions (e.g., temporal first viewer reactions 204) with additional viewer reactions (e.g., temporal additional viewer reactions 208) to form multi-viewer temporal commentary (e.g., multi-viewer temporal commentary 210)

involves synchronizing the responses of different viewers (e.g., first viewer 202 and additional viewers 206) according to the exact moments they occur within the timeline of the streaming media (e.g., streaming media 200). This process begins with collecting the individual reactions of viewers (e.g., first viewer 202 and additional viewers 206), each marked with a precise timestamp reflecting when during the streaming media (e.g., streaming media 200) the reaction was made. These reactions (e.g., temporal first viewer reactions 204 and/or temporal additional viewer reactions 208), which can range from text comments and emojis to audio feedback, may then be aligned based on these timestamps, effectively synchronizing different viewers' reactions (e.g., temporal first viewer reactions 204 and/or temporal additional viewer reactions 208) that occurred at the same moments within the streaming media (e.g., streaming media 200).

Reaction aggregation process 10 may temporally provide 112 the multi-viewer temporal commentary (e.g., multi-viewer temporal commentary 210) for the streaming media (e.g., streaming media 200) to future viewers (e.g., future viewers 214) of the streaming media (e.g., streaming media 200) while the future viewers (e.g., future viewers 214) are consuming the streaming media (e.g., streaming media 200).

Generally speaking, the outcome of the above-described temporal alignment is a comprehensive, multi-layered commentary (e.g., multi-viewer temporal commentary 210) that runs parallel to the media (e.g., streaming media 200), enriching the content with the collective experience of its audience. This innovative approach to viewer interaction not only enhances the viewing experience by embedding a sense of community and shared response but also introduces a dynamic layer of engagement, where future viewers (e.g., future viewers 214) can witness and participate in the communal reactions of those who watched before them.

For content creators and analysts, this aggregated temporal commentary (e.g., multi-viewer temporal commentary 210) provides invaluable insights into audience engagement, revealing the moments that resonate most profoundly with viewers. By identifying these key points of interaction, creators can tailor their future content to better align with audience preferences, enhancing the overall quality and appeal of their offerings. Furthermore, this method of reaction collection and synchronization serves as a navigational tool for viewers (e.g., future viewers 214), highlighting the content's most engaging segments and guiding them through the collective experience of the audience. This not only boosts engagement but also may foster a more interactive and connected viewing community, transforming the solitary act of content consumption into a shared experience.

Figure 4:
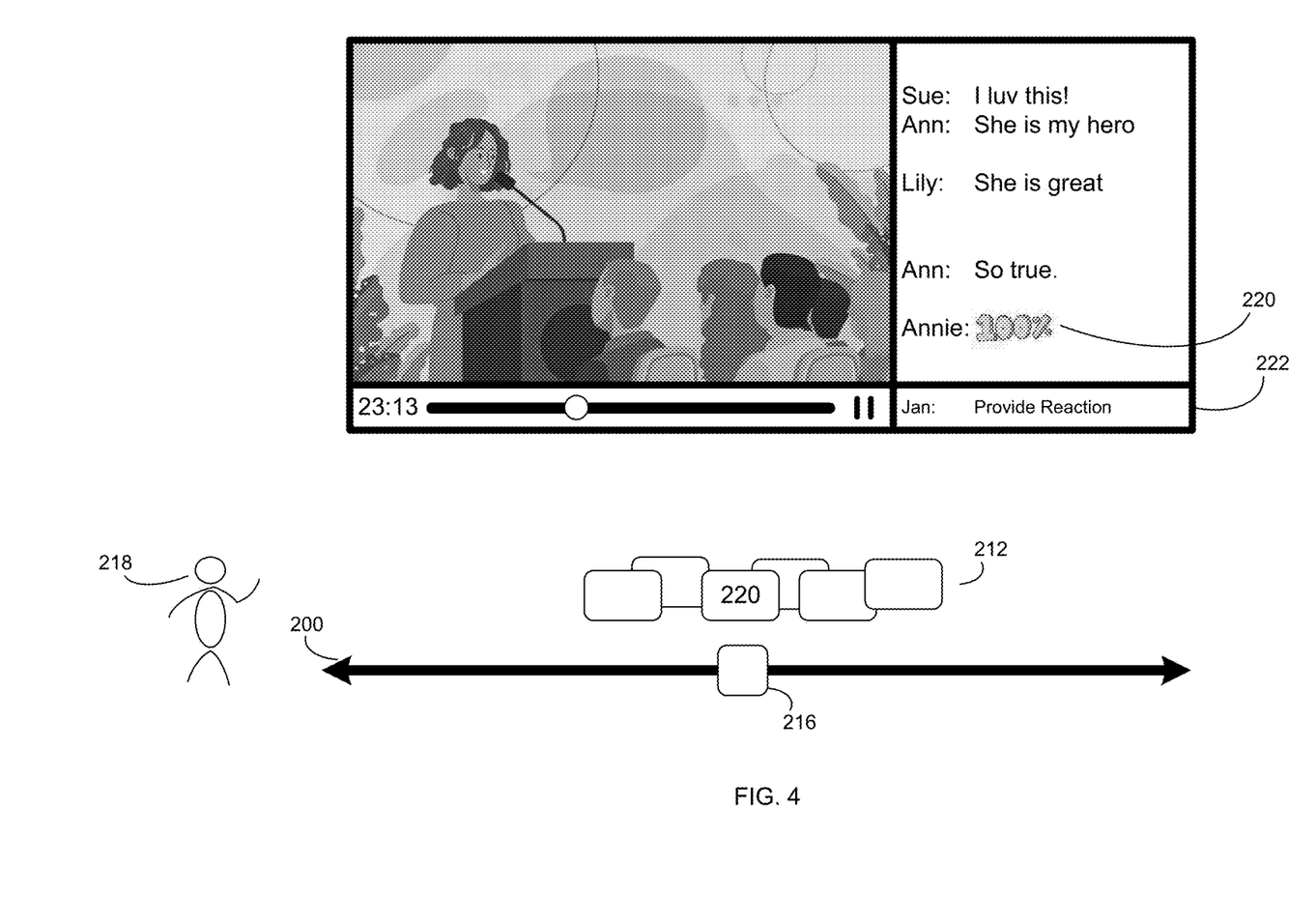
FIG. 4 is a diagrammatic view of the manner in which reactions are displayed to users of the reaction aggregation process of FIG. 1 according to an embodiment of the present disclosure.

For example and referring also to FIG. 4, when temporally providing 112 the multi-viewer temporal commentary (e.g., multi-viewer temporal commentary 210) for the streaming media (e.g., streaming media 200) to future viewers (e.g., future viewers 214) of the streaming media (e.g., streaming media 200) while the future viewers (e.g., future viewers 214) are consuming the streaming media (e.g., streaming media 200), reaction aggregation process 10 may identify 114 a portion of the streaming media (e.g., streaming media 200) currently being consumed by the future viewers (e.g., future viewers 214), thus defining a currently-consumed portion (e.g., currently-consumed portion 216). For this example, assume that future viewer 218 (e.g., Jan) is currently viewing streaming media 200 at time 23:13. Accordingly, currently-consumed portion 216 is the portion of streaming media 200 proximate 23:13.

Further and when temporally providing 112 the multi-viewer temporal commentary (e.g., multi-viewer temporal commentary 210) for the streaming media (e.g., streaming media 200) to future viewers (e.g., future viewers 214) of the streaming media (e.g., streaming media 200) while the future viewers (e.g., future viewers 214) are consuming the streaming media (e.g., streaming media 200), reaction aggregation process 10 may associate 116 a portion of the multi-viewer temporal commentary (e.g., multi-viewer temporal commentary 210) with the currently-consumed portion (e.g., currently-consumed portion 216) of the streaming media (e.g., streaming media 200), thus defining an associated portion (e.g., associated portion 220). For this example, assume that associated portion 220 of multi-viewer temporal commentary 210 includes a "100%" emoji posted by an earlier viewer "Annie" (e.g., either first viewer 202 or one of additional viewers 206).

Additionally and when temporally providing 112 the multi-viewer temporal commentary (e.g., multi-viewer temporal commentary 210) for the streaming media (e.g., streaming media 200) to future viewers (e.g., future viewers 214) of the streaming media (e.g., streaming media 200) while the future viewers (e.g., future viewers 214) are consuming the streaming media (e.g., streaming media 200), reaction aggregation process 10 may render 118 the associated portion (e.g., associated portion 220) of the multi-viewer temporal commentary (e.g., multi-viewer temporal commentary 210) while the future viewers (e.g., future viewer 218) of the streaming media (e.g., streaming media 200) are consuming the currently-consumed portion (e.g., currently-consumed portion 216) of the streaming media (e.g., streaming media 200).

Additionally, reaction aggregation process 10 may enable the future viewers (e.g., future viewer 218) to provide temporal viewer reactions (e.g., via reaction box 222), which will be added to the multi-viewer temporal commentary (e.g., multi-viewer temporal commentary 210) for future viewing by future viewers of the streaming media (e.g., streaming media 200).

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   providing streaming media to a first viewer;
   receiving one or more temporal first viewer reactions while the first viewer is consuming the streaming media;
   providing the streaming media to additional viewers;
   receiving one or more temporal additional viewer reactions while the additional viewers are consuming the streaming media;
   temporally aligning the one or more temporal first viewer reactions with the one or more temporal additional viewer reactions to form multi-viewer temporal commentary for the streaming media; and temporally providing the multi-viewer temporal commentary for the streaming media to future viewers of the streaming media while the future viewers are consuming the streaming media, wherein temporally providing the multi-viewer temporal commentary for the streaming media to future viewers of the streaming media while the future viewers are consuming the streaming media includes:

identifying a portion of the streaming media currently being consumed by the future viewers, thus defining a currently-consumed portion;

associating a portion of the multi-viewer temporal commentary with the currently-consumed portion of the streaming media including the one or more temporal first viewer reactions and the one or more temporal viewer reactions received during the portion, thus defining an associated portion; and rendering the associated portion of the multi-viewer temporal commentary while the future viewers of the streaming media are consuming the currently-consumed portion of the streaming media.

2. The computer-implemented method of claim 1 wherein the streaming media includes one or more of:

a podcast;
a streaming media file;
a political advertisement;
a movie screening;
a business presentation;
an informational presentation;
a communal/regional presentation; and
an educational presentation.

3. The computer-implemented method of claim 1 wherein the reactions includes one or more of:

an emoji;
a text-based comment;
an image-based comment;
a video-based comment;
an audio-based comment; and
a link-based external information source.

4. The computer-implemented method of claim 1 wherein the viewer reactions are time stamped to associate viewer reactions with specific portions of the streaming media.

5. The computer-implemented method of claim 4 wherein temporally aligning the one or more temporal first viewer reactions with the one or more temporal additional viewer reactions to form multi-viewer temporal commentary for the streaming media includes:

sequencing the combination of the one or more temporal first viewer reactions and the one or more temporal additional viewer reactions based, at least in part, upon the time stamp of the viewer reactions.

6. A computer program product residing on a non-transitory computer readable medium having a plurality of instructions stored thereon which, when executed by a processor, cause the processor to perform operations comprising:

providing streaming media to a first viewer;
receiving one or more temporal first viewer reactions while the first viewer is consuming the streaming media;
providing the streaming media to additional viewers;
receiving one or more temporal additional viewer reactions while the additional viewers are consuming the streaming media;

temporally aligning the one or more temporal first viewer reactions with the one or more temporal additional viewer reactions to form multi-viewer temporal commentary for the streaming media; and temporally providing the multi-viewer temporal commentary for the streaming media to future viewers of the streaming media while the future viewers are consuming the streaming media, wherein temporally providing the multi-viewer temporal commentary for the streaming media to future viewers of the streaming media while the future viewers are consuming the streaming media includes:

identifying a portion of the streaming media currently being consumed by the future viewers, thus defining a currently-consumed portion;

associating a portion of the multi-viewer temporal commentary with the currently-consumed portion of the streaming media including the one or more temporal first viewer reactions and the one or more temporal viewer reactions received during the portion, thus defining an associated portion; and rendering the associated portion of the multi-viewer temporal commentary while the future viewers of the streaming media are consuming the currently-consumed portion of the streaming media.

7. The computer program product of claim 6 wherein the streaming media includes one or more of:

a podcast;

a streaming media file;

a political advertisement;

a movie screening;

a business presentation;

an informational presentation;

a communal/regional presentation; and an educational presentation.

8. The computer program product of claim 6 wherein the reactions includes one or more of:

an emoji;

a text-based comment;

an image-based comment;

a video-based comment;

an audio-based comment; and a link-based external information source.

9. The computer program product of claim 6 wherein the viewer reactions are time stamped to associate viewer reactions with specific portions of the streaming media.

10. The computer program product of claim 9 wherein temporally aligning the one or more temporal first viewer reactions with the one or more temporal additional viewer reactions to form multi-viewer temporal commentary for the streaming media includes:

sequencing the combination of the one or more temporal first viewer reactions and the one or more temporal additional viewer reactions based, at least in part, upon the time stamp of the viewer reactions.

11. A computing system including a processor and memory configured to perform operations comprising:

providing streaming media to a first viewer;

receiving one or more temporal first viewer reactions while the first viewer is consuming the streaming media;

providing the streaming media to additional viewers;

receiving one or more temporal additional viewer reactions while the additional viewers are consuming the streaming media;

temporally aligning the one or more temporal first viewer reactions with the one or more temporal additional viewer reactions to form multi-viewer temporal commentary for the streaming media; and temporally providing the multi-viewer temporal commentary for the streaming media to future viewers of the streaming media while the future viewers are consuming the streaming media, wherein temporally providing the multi-viewer temporal commentary for the streaming media to future viewers of the streaming media while the future viewers are consuming the streaming media includes:

identifying a portion of the streaming media currently being consumed by the future viewers, thus defining a currently-consumed portion;

associating a portion of the multi-viewer temporal commentary with the currently-consumed portion of the streaming media including the one or more temporal first viewer reactions and the one or more temporal viewer reactions received during the portion, thus defining an associated portion; and rendering the associated portion of the multi-viewer temporal commentary while the future viewers of the streaming media are consuming the currently-consumed portion of the streaming media.

12. The computing system of claim 11 wherein the streaming media includes one or more of:
a podcast;
a streaming media file;
a political advertisement;
a movie screening;
a business presentation;
an informational presentation;
a communal/regional presentation; and
an educational presentation.

13. The computing system of claim 11 wherein the reactions includes one or more of:
an emoji;
a text-based comment;
an image-based comment;
a video-based comment;
an audio-based comment; and
a link-based external information source.

14. The computing system of claim 11 wherein the viewer reactions are time stamped to associate viewer reactions with specific portions of the streaming media.

15. The computing system of claim 14 wherein temporally aligning the one or more temporal first viewer reactions with the one or more temporal additional viewer reactions to form multi-viewer temporal commentary for the streaming media includes:
sequencing the combination of the one or more temporal first viewer reactions and the one or more temporal additional viewer reactions based, at least in part, upon the time stamp of the viewer reactions.

* * * * *